June 10, 1958

A. P. HOKE 2,837,855

PRESERVATION OF ARRANGEMENTS MADE OF
DRIED FLOWERS AND THE LIKE
Filed Sept. 19, 1955

INVENTOR.
AGNES P. HOKE
BY
ATTORNEY

United States Patent Office 2,837,855
Patented June 10, 1958

2,837,855

PRESERVATION OF ARRANGEMENTS MADE OF DRIED FLOWERS AND THE LIKE

Agnes P. Hoke, Princeton, N. J.

Application September 19, 1955, Serial No. 535,119

4 Claims. (Cl. 41—12)

This invention relates to the arrangement of dried flowers and the like and more particularly to methods and apparatus for making and preserving arrangements of dried flowers and the like.

Winter bouquets made of dried flowers, leaves, and the like are as gay, charming, and colorful as fresh flowers when properly preserved and arranged. These bouquets customarily consist of arrangements of flowers from garden and roadside, sprays of leaves, ornamental grasses and seed pods collected from far and near. Such a bouquet may be a lasting object of beauty during the drab days of winter when artistically arranged and secured.

It is a primary object of this invention to provide an improved method for mounting dried flowers and the like.

It is another object of this invention to provide means for making the arrangement of dried flowers and the like permanent.

According to this invention dried flowers and the like are first arranged in a container partially filled with a granular substance such as sand. A liquifiable material in its liquid state is then poured onto the upper surface of the sand to envelop a portion of the stems of the dried flowers and the like. After this material has solidified the combination of the dried flowers and solid material is removed from the sand and the stems of the dried flowers are cut off at the bottom surface of the solid material. The base of the solid material is then capped with a solid cap or with additional liquifiable material in its liquid state which is then allowed to solidify in order to present a smooth bottom surface to the solid material in which the stems of the dried flowers and the like are supported.

Additional objects of this invention will become apparent upon a reading of the following specification when considered in connection with the accompanying drawing wherein.

In each of the figures of the drawing the same numeral designates the same element.

Figure 1:
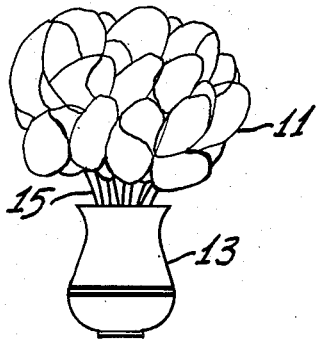
Figure 1 illustrates a winter bouquet.

Turning now in more detail to Figure 1 there is shown the finished product wherein dried flowers and the like 11 are placed in a container 13.

Some materials suitable for such an arrangement and readily available are straw flowers, cockscomb, salvia, larkspur, and hydrangea from the garden, golden rod, clover, Queen Anne's Lace, sumac, milkweed, cattails, and fern found in field and swamp, branches of dogwood, maple, beech, or oak picked and preserved when color is at its peak. Less available in most of the United States but attractive are exotic leaves and seed pods from tropical or semi-tropical climates.

Many types of containers are suitable for dried arrangements. Silver, pewter, copper, brass, china, pottery, glass, also driftwood, or a piece of weathered wood, are all possibilities. The choice of container 13 depends on where the bouquet is to be used and the kind of arrangement to be made in it. For instance, on a formal dining table a silver bowl would be more appropriate than a piece of driftwood or crude pottery, and the reverse may be true for a modern or informal setting.

Since different types of containers are particularly suitable for different locations and surroundings it is important that it be convenient to change the dried flower arrangement from one type of container to another type of container. According to this invention the flower arrangement can be quickly transferred from one type of container to another. This is possible because the dried flower arrangement is held in place or secured by a piece of solid material into which a portion of each of the dried flower stems has been embedded.

Figure 2:
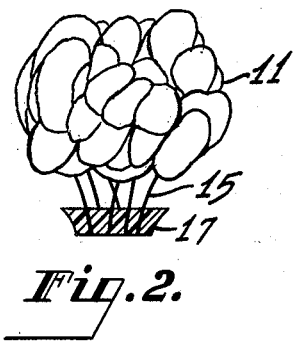
Figure 2 illustrates this invention in one of its forms.

Turning to Figure 2 there is shown a dried flower arrangement made in accordance with the teachings of the present invention wherein the dried flowers 11 have stems 15 which are embedded in a solid material 17. The solid material 17 may consist of a mineral wax such as paraffin, a plastic material, or a like substance which is normally a solid material but may be warmed or otherwise treated so that it may be poured in and around the stems 15 of the dried flowers 11 and allowed to harden.

The process by which the dried flower arrangement shown in Figure 2 is made will be described in connection with the description of Figures 3, 4, 5, and 6 of the drawing.

Figure 3:
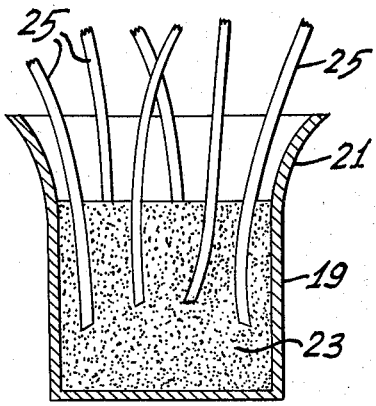
Figure 3 illustrates the first step in the performance of this invention wherein the flowers and the like are placed in a vase partially filled with a granular substance such as sand.

In Figure 3 a container 19 has a bell shaped top 21. Container 19 is partially filled with a granular substance 23 which may be sand, small glass beads, or similar substance.

The purpose of the granular substance 23 in the container 19 is to permit the arranger to stick the stems 25 of the dried flowers and the like into the granular substance 23 in order that the stems 25 will maintain the desired position. Thus the arranger may easily make changes in the arrangement without damaging the delicate stems of the dried flowers. It is also possible to use stiff wires to support weak stems or other objects of decoration which do not have a stem. By providing a container 19 with a long neck so that the granular substance 23 is relatively deep the stems 25 may be inserted to various depths, permitting the decorator to experiment with a number of different arrangements. The arranger should have heavy pin-holders, fine wire or green florist's thread, clippers, and scissors. Thread or wire is used for fastening small bunches of flowers together and for wiring extensions on stems that are too short. If a large arrangement is to be made a heavy pin-holder anchored firmly in the granular substance is used.

When a dried flower arrangement has been made to the satisfaction of the arranger the liquid wax or other liquifiable material is poured into the container 19 to cover the granular substance 23 and to envelop a portion of each of the stems 25. This is illustrated in Figure 4.

Figure 4:
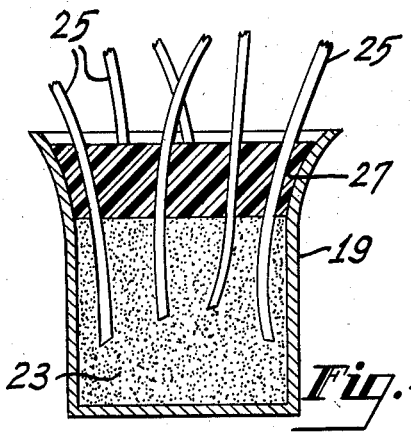
Figure 4 illustrates the operation after the molten wax or other liquifiable material is poured into the vase onto the top of the sand and permitted to envelop a portion of the stems of the dried flowers.

In Figure 4 there is shown a quantity of liquifiable material 27 which has been poured into the container 19 to envelop the stems 25. The depth of the liquifiable material 27 is made sufficient to hold the stems 25 securely, thus preventing the component parts of the arrangement from changing position in relation to each other.

The liquifiable material is then permitted to solidify. When the liquifiable material 27 has solidified the combination of the stems 25 and the solidified substance 27 is removed from the granular substance 23.

Figure 5:
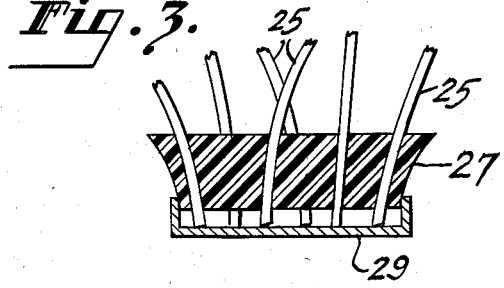
Figure 5 illustrates the operation and performance of this invention wherein the stems have been cut off below the solid material and a solid cap placed on the bottom of the solid material in order to provide a flat-bottomed surface for the supporting member or the solid material holding the stems of the dried flowers.

Turning now to Figure 5 there is shown the next step in the process of preserving the arrangement of dried flowers wherein the stems are cut off immediately below the solid material 27. This may be done with scissors or sharp knife.

In order to provide a flat base to the combination of the solid material 27 and the flowers arranged therein a cap 29 is placed over the bottom and secured to the solid material 27. The cap 29 may be of plastic material or it may be made of bakelite or metal. It is important that the cap 29 be securely fastened to the solid material 27.

Figure 6:
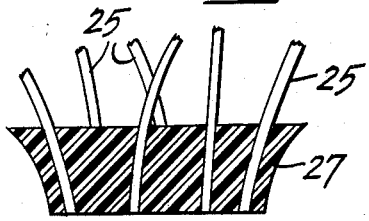
Figure 6 shows another form of this invention wherein a cap is provided for the bottom of the supporting member, the cap being of the same material as the supporting member.

In Figure 6 there is shown another form of cap made in accordance with the teachings of the present invention. After the stems 25 have been cut off immediately below the solid material 27 additional liquifiable material 27 in its liquid state is molded around the base as illustrated in Figure 6. The additional liquid material is then permitted to solidify to form a solid piece with material 27.

It will be seen that the preservation of arrangements of dried flowers as taught by the present invention enables the use of a variety of containers. Dried flower arrangements made in the manner outlined above will, with proper care, last indefinitely.

The practice of this invention permits arrangements of dried flowers and the like to be shipped without disarrangement or damage.

Having thus described the invention, what is claimed is:

1. The method of fixing arrangements of flowers and the like comprising the steps of partially filling a container with a granular substance in its granular form, arranging said flowers and the like by sticking the stems of flowers and the like in said granular substance, after the flowers and the like have been arranged, adding to the container, on top of the granular substance and around said stems, a liquid capable of changing to a solid and without disturbing the arrangement causing the liquid to change to a solid to fix the arrangement.

2. The method of fixing arrangements of flowers and the like comprising the steps of partially filling a container with a granular substance in its granular form, arranging the flowers and the like by sticking their stems in said granular substance, after the flowers have been arranged adding to the container, on top of the granular substance and around said stems, a liquid capable of changing to a solid, without disturbing the arrangement causing the liquid to change to a solid to fix the arrangement, removing the combination of said flowers and the like and said solidified liquid from said container, removing the stems of said flowers and the like which extend below said solidified liquid, and finishing the bottom of the solidified liquid to cover the ends of the stems and to provide an even bottom surface to the solidified liquid.

3. The method of preserving arrangements of flowers or the like comprising the steps of partially filling a container with a granular substance; arranging flowers or the like in said granular substance; after the flowers or the like have been arranged, adding to the container, on top of the granular substance and around said stems, a liquid adapted to change to a solid at normal room temperature, the size of the granular substance and the viscosity of said liquid being such that the liquid penetrates only slightly below the upper surface of said granular substance; without disturbing the arrangement, causing the liquid to change to a solid to set the arrangement; removing the combination of said flowers and the like and the solidified liquid from said container; and removing the stems extending below the bottom of the solidified liquid.

4. The method of preserving arrangements of flowers and the like comprising the steps of partially filling a container with a granular substance, arranging flowers and the like in said granular substance, after the flowers and the like have been arranged, adding to the container, on top of the granular substance and around said stems, a liquid adapted to change to a solid, the characteristics of the granular substance and of the liquid being such that the liquid remains substantially above the upper surface of said granular substance, causing the liquid to change to a solid to fix the arrangement, removing the flowers and the like and the solidified liquid from said container, removing the stems extending below the bottom of the solidified liquid, and smoothing the bottom of the solidified liquid by adding additional liquid adapted to change to a solid on the bottom of said solidified liquid and causing the liquid added to the bottom of said solidified liquid to solidify and provide a smooth base for the arrangement.

References Cited in the file of this patent

UNITED STATES PATENTS

| | | |
|---|---|---|
| 451,645 | Tudor | May 5, 1891 |
| 603,649 | Leedy | May 10, 1898 |
| 1,295,581 | Palmer | Feb. 25, 1919 |
| 1,589,848 | Harrison | June 22, 1926 |
| 1,621,818 | Wallace | Mar. 22, 1927 |
| 1,828,295 | Roy | Oct. 20, 1931 |
| 2,307,286 | Matignon | Jan. 5, 1943 |

OTHER REFERENCES

Kiplinger: "A longer life for cut flowers," published in New York Times, Sunday, November 16, 1947, section 2, page 26X.